Jan. 13, 1959 R. E. OWEN 2,868,571
RESILIENT BUSHING

Filed Jan. 18, 1956 2 Sheets-Sheet 1

INVENTOR.
Robert E. Owen
BY
Paul Fitzpatrick
ATTORNEY

Jan. 13, 1959 R. E. OWEN 2,868,571
RESILIENT BUSHING
Filed Jan. 18, 1956 2 Sheets-Sheet 2

INVENTOR.
Robert E. Owen
BY Paul Kilpatrick
ATTORNEY

United States Patent Office 2,868,571
Patented Jan. 13, 1959

2,868,571

RESILIENT BUSHING

Robert E. Owen, Detroit, Mich., assignor to General Motors Corporation, Detroit, Mich., a corporation of Delaware Application January 18, 1956, Serial No. 559,809

5 Claims. (Cl. 287—85)

This invention relates to flexible joints and more particularly to flexible joints wherein concentrically arranged cylindrical members have interposed therebetween an annular rubber mass which is adapted to cushion loads imposed on either cylindrical member.

Numerous forms of so-called rubber bushings are well known in the prior art. However, the most common form consists essentially of concentrically disposed inner and outer tubular members having an annular rubber mass interposed therebetween under substantial compression. In this form, it is conventional practice to secure the inner sleeve rigidly on a rigid shaft in such a manner as to prevent axial and rotational movement, while the outer member is secured to a lever or other device which is intended primarily for rotation about the axis of the bushing. In certain applications where the lever or other device may also be subject to side thrust loads, the rubber annulus and tubular members are usually provided with suitable end flanges to resist axial loads thereon. While bushings of the type referred to perform admirably under most circumstances, certain operational disadvantages arise in cases where relative rotary movement between the tubular members is large. Thus, for example, when rubber bushings are employed as pivot joints for vehicle suspension wishbone arms, torsional loading of the rubber annulus builds up rapidly and becomes excessive due to the large relative movement of the outer sleeve of the bushing with respect to the inner sleeve.

It is an object of the present invention to provide a bushing of the type referred to wherein the annular rubber mass is relieved of torsional loads.

Another object is to provide a bushing having inner and outer concentrically disposed cylindrical members between which are disposed an annular rubber mass, one of the cylindrical members having bonded or otherwise deposited on one surface thereof a thin film of non-metallic anti-friction material to form a low friction bearing surface.

Another object is to provide a bushing of the stated character wherein the annular rubber mass is provided with portions capable of cushioning and resisting axial loads imposed on one or the other of the tubular members.

A further object is to provide a bushing of the type described wherein one of the cylindrical members is coated with a very thin film of sintered Teflon.

Still another object is to provide a bearing structure of the type referred to which may be readily assembled and disassembled.

Yet another object is to provide a rubber bushing having a non-metallic low friction bearing surface wherein the rubber is so formed as to provide a seat portion adapted to prevent entry of dirt into the bearing surface.

Yet a further object is to provide a rubber bushing of the stated character which is simple in construction, low in cost and durable in operation.

These and other objects, advantages and features of the invention will become more fully apparent as reference is had to the accompanying specification and drawings wherein.

Figure 1:
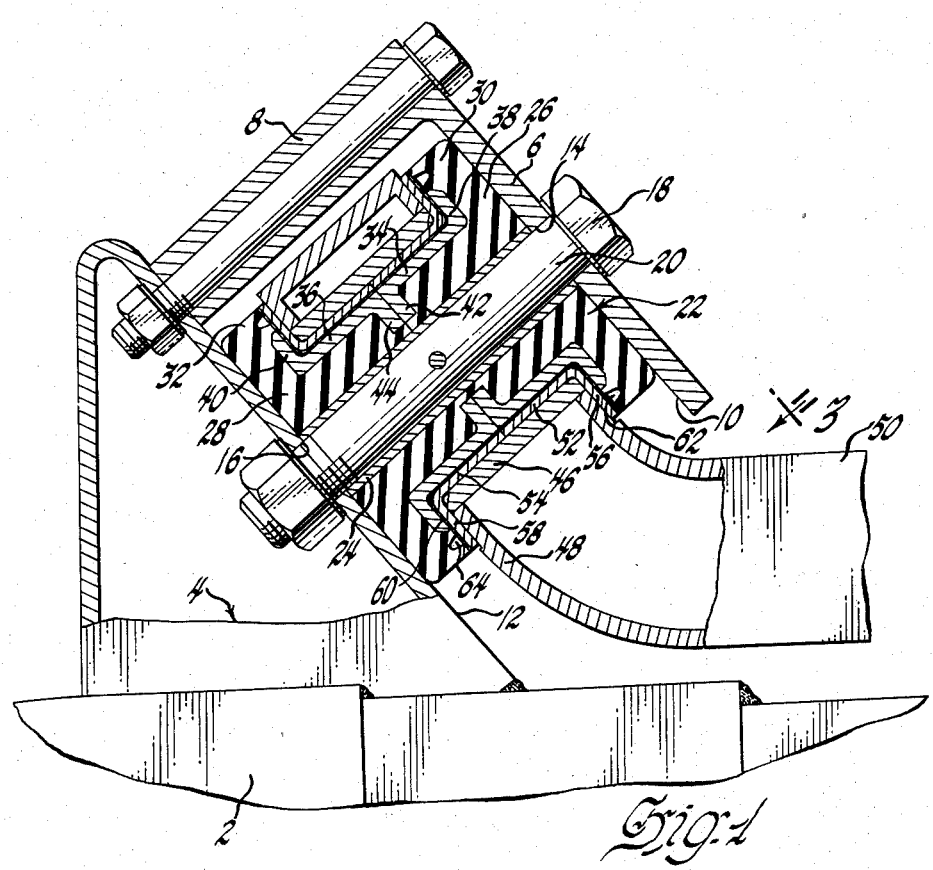
Fig. 1 is a sectional plan view of one form of the invention.
Figure 3:
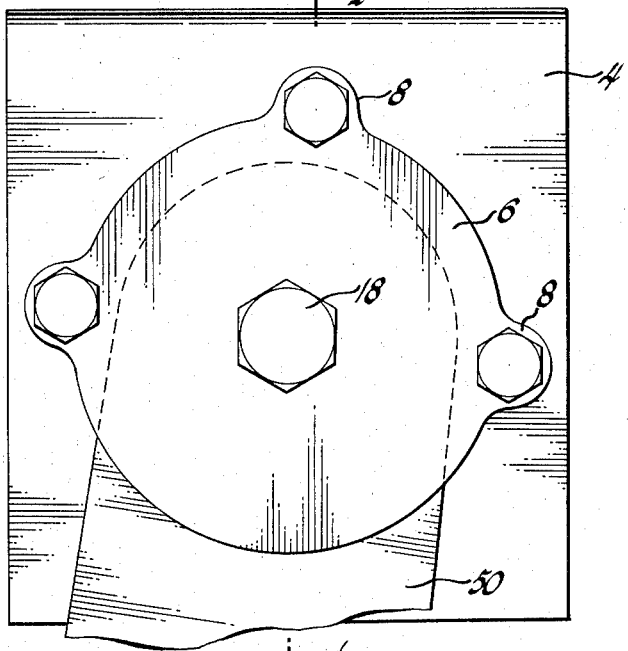
Fig. 3 is a rear elevational view looking in the direction of arrows 3—3 of Fig. 1.

Referring now to the drawings and particularly Figs. 1 and 3, there is illustrated a portion of a vehicle frame 2 in which the reference numeral 4 designates generally a bracket to which is secured a demountable bushing housing 6. As seen in Fig. 3, housing 6 comprises a plate structure having circumferentially spaced tubular legs 8 which serve as spacers to establish the distance between the inner wall 10 of cover plate 6 and the outer wall 12 of bracket 4. Formed centrally in plate 6 and bracket 4 are apertures 14 and 16 through which extends a bolt 18. The midportion 20 of bolt 18 serves to support a rubber bushing structure 22. Bushing structure 22 is symmetrical in configuration and adapted for sequential endwise assembly. As seen in Fig. 1, an elongated straight walled tubular member 24 is dimensioned lengthwise so as to occupy the space between walls 10 and 12. Disposed in concentric relation about member 24 are a pair of reversely similar resilient annular members 26 and 28, each of which is provided with circumferential radially directed end flanges 30 and 32, respectively. Disposed in concentric relation about the outer peripheries of resilient members 26 and 28 are a pair of endwise abutting reversely similar sleeve members 34 and 36. Members 34 and 36 are provided at their outer edges with circumferential radially outwardly extending flanges 38 and 40 and at their inner edges with circumferential radially inwardly extending flanges 42 and 44. When bushing 22 is in assembled relation, sleeve members 34 and 36 form a shouldered annular journal portion for a sleeve-like bearing portion 46 which is welded or otherwise secured at the inner end 48 of one leg of a wishbone type suspension arm 50. It will be understood that the inner end of the other leg of wishbone 50, not shown, is also provided with a sleeve-like bearing portion which is mounted on a similar bushing structure arranged coaxially with structure 22.

Figure 2:
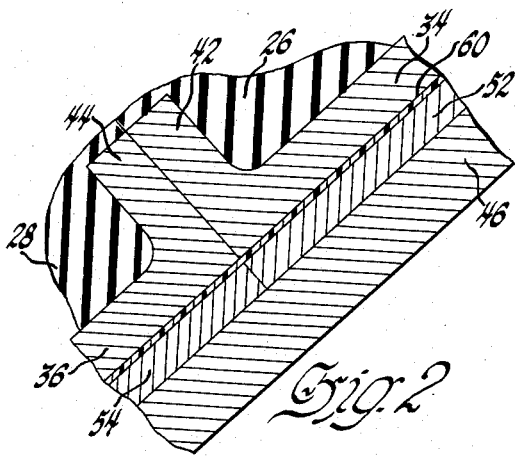
Fig. 2 is an enlarged sectional plan view more clearly illustrating the details of construction of the bushing shown in Fig. 1.

In order to permit free rotary movement of arm 50 relative to bolt 18 without producing undesirable torsional loading of resilient bushings 26 and 28, bearing portion 46 has press fitted therein a pair of symmetrical flanged sleeves 52 and 54. As seen best in Fig. 2, the inner peripheral wall of sleeves 52 and 54 and the outer faces of the end flanges 56 and 58 thereof are coated with a thin film 60 of polytetrafluoroethylene or "Teflon" which provides an extremely low friction bearing surface in direct engagement with the outer peripheral wall and shoulders of the non-rotatable journal portion formed by sleeve members 34 and 36. Film 60 is of very limited thickness preferably between .001 and .0015 inch. To secure a Teflon film of the indicated thickness to the sleeve members, an aqueous dispersion of polytetrafluoroethylene is applied to the walls as by spraying, dipping or brushing. The resultant coating is then sintered at an elevated temperature to produce a permanent bond with the sleeve walls. For a more complete and detailed description of such a process, reference may be had to the co-pending application of Arnold De Hart et al., Serial No. 365,383, filed July 1, 1953, now Patent No. 2,817,562 entitled Coated Piston Ring, assigned to General Motors Corporation. When thus arranged, the sleeves 52 and 54 provide low friction working surfaces which substantially reduce rotational friction as well as friction resulting from axial and torsional loading of wishbone arm 50. It will be understood that the Teflon film 60 need not necessarily be applied to sleeves 52 and 54, but may with equal efficacy be applied to the outer periphery and shoulders of the sleeve members 34 and 36. In order to prevent entrance of dust or other foreign matter into the low friction working surface provided, the end flanges 30 and 32 of resilient bushings 26 and 28 are provided with axially inwardly facing circumferential ribbed portions 62 and 64 which bear against the terminal rims of flanges 56 and 58 when the bushing is in assembled relation. It will be understood that the resilient members 26 and 28 are subjected to substantial axial loading when bolt 18 is drawn up to lock tubular member 24 in fixed relation to bracket 4 and cover plate 6.

When assembled in the manner described, the present bushing construction permits the annular rubber bushings 26 and 28 to accomplish the desired function of isolating transmission of road noises, cushioning shock, resisting twisting and axial loads imposed on wishbone 50, etc., while completely eliminating undesirable torsional loading of members 26 and 28 as a result of swinging movement of arm 50. As a result, there is provided a flexible joint which possesses all of the desirable attributes of conventional rubber bushings, while affording optimum freedom from static and dynamic frictional resistance to rotational or swinging movement of wishbone 50. In addition, the structure totally eliminates the necessity for lubrication in any form. The purpose of making elements 26, 28, 34 and 36 as separate parts is, of course, to facilitate assembly of the bushing.

Figure 5:
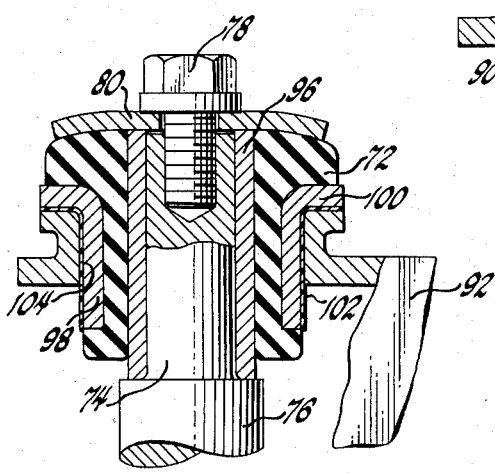
Fig. 5 is a sectional plan view of a second modification of the invention.
Figure 4:
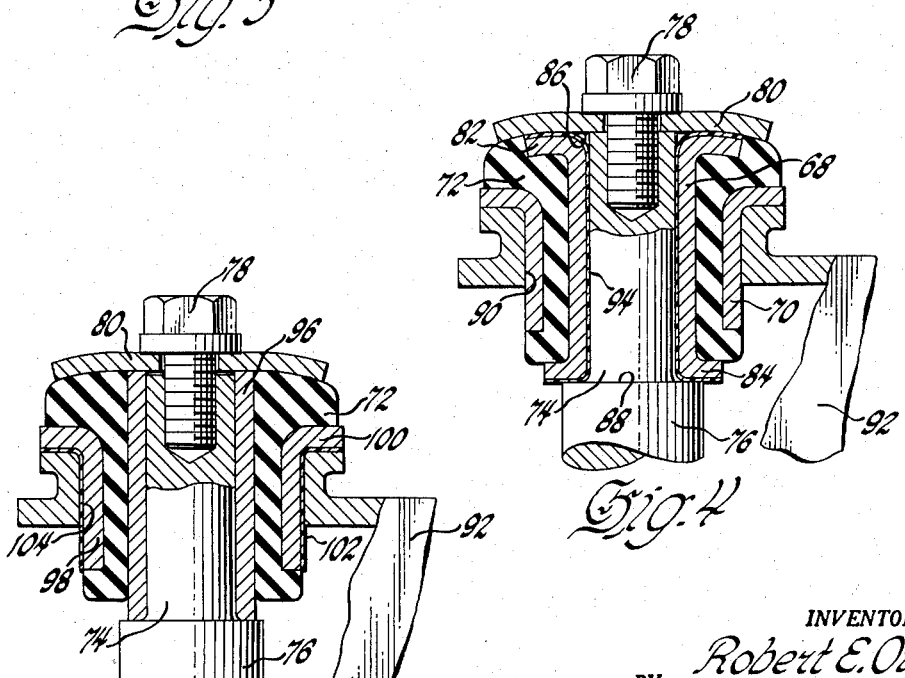
Fig. 4 is a sectional plan view of a modified form of bushing embodying the present invention.

In Figs. 4 and 5, there are illustrated modifications of the invention as applied to a conventional permanently assembled type of resilient bushing generally similar to those used extensively in certain current automobile suspension. As seen in Fig. 4, the bushing comprises an inner tubular sleeve 68 and an outer tubular sleeve 70 which have disposed therebetween an annular rubber mass 72. In this form of bushing, rubber mass 72 in unassembled form is usually of considerably greater volume than the space in which it is ultimately confined so that when the bushing is assembled, the rubber mass is subjected to relatively high circumferential and radial compression. Inner tubular member 68 is slidably disposed over a suitably dimensioned reduced portion 74 at one end of a symmetrical pivot shaft 76. End portion 74 is adapted to receive a bolt 78 which, in turn, retains an end plate 80 against the outer face of end portion 74. In the embodiment shown, the inner tubular member 68 is provided with an outer end flange 82 and an inner end flange 84 which lie in abutting relation with the inner face 86 of plate 80 and the shoulder 88 at the base of reduced portion 74, respectively. The outer sleeve 70 is preferably press fitted into a flanged aperture 90 formed in one leg of a symmetrical wishbone arm 92. It will be understood that the other leg of arm 92 is supported in a similar manner by a bushing structure similar to that described, but which faces in the opposite direction. In order to permit free relative rotation between arm 92 and pivot shaft 76 without producing torsional loading on annular rubber mass 72, the inner periphery of inner tubular member 68 and the end wall of the flanges 82 and 84 thereof are provided with a continuous film 94 of polytetrafluoroethylene or Teflon in the same manner as previously described with respect to the embodiment of Fig. 1.

In the embodiment shown in Fig. 5, the bushing comprises a straight walled inner tubular member 96 which is slightly greater in length than the lengthwise dimension of reduced portion 74. Therefore, when bolt 78 is drawn up, plate 80 exerts axial pressure on the inner tubular member 96 and retains the latter against rotation relative to portion 74. Accordingly, to eliminate torsional loading on the resilient annular member 72, the outer periph- eral wall of outer tubular member 98 and the inner face of the flange 100 thereof are provided with a continuous film 102 of sintered Teflon which affords an anti-friction bearing surface for the flanged cylindrical aperture 104 formed at the inner end of one leg of the wishbone arm 92. It will be understood that the opposite leg of arm 92 is similarly constructed and is associated with a bushing assembly of identical configuration but facing in the opposite direction. Therefore, the flange 100 and its counterpart on the other bushing, not shown, coact to prevent axial displacement of wishbone arm 92 in either direction.

While but several embodiments of the invention have been shown and described, it will be evident that numerous changes, modifications and variations may be made therein. Accordingly, it is to be understood that it is not intended to limit the invention to the embodiments shown, but only by the scope of the claims which follow.

I claim:

1. In combination, a lever arm having a cylindrical portion integral therewith, a resilient bushing assembly disposed in said cylindrical portion and adapted to accommodate swinging movement of said arm, said bushing assembly comprising endwise abutting outer sleeve members, a tubular inner member concentric with said outer sleeve members, a pair of symmetrical resilient annular members disposed between said sleeve members and said tubular member, support means securing said tubular member against axial and rotary movement, and additional sleeve means carried by said cylindrical portion, said last mentioned means being provided with a thin film of Teflon forming a low friction bearing surface coacting with the outer periphery of each of said outer sleeve members.

2. In combination, a lever arm having a cylindrical portion integral therewith, a resilient bushing assembly disposed in said cylindrical portion and adapted to accommodate swinging movement of said arm, said bushing assembly comprising endwise abutting outer sleeve members having circumferential end flanges, a straight walled tubular inner member concentric with said outer sleeve members, a pair of endwise abutting symmetrical resilient annular members disposed between said sleeve members and said tubular member, support means securing said tubular member against axial and rotary movement, and additional flanged sleeve means carried by said cylindrical portion, said last mentioned means being provided with a thin film of Teflon forming a low friction rotary and axial bearing surface coacting with the outer periphery and circumferential flanges of each of said outer sleeve members.

3. In combination, a swingable lever arm having a cylindrical portion integral therewith, a resilient bushing assembly disposed in said cylindrical portion and adapted to support said arm, said bushing assembly comprising endwise abutting flanged outer sleeve members, a tubular inner member concentric with said outer sleeve members, a pair of symmetrical resilient annular members having circumferential end flanges, said resilient annular members being disposed between said sleeve members and said tubular member, support means securing said tubular member against axial and rotary movement and exerting axial pressure on said resilient annular members, and additional sleeve means carried by said cylindrical portion, said last mentioned means having a thin film of Teflon bonded thereto forming a low friction bearing surface coacting with the outer periphery of each of said outer sleeve members.

4. In combination, a swingable lever arm having a cylindrical portion integral therewith, a resilient bushing assembly disposed in said cylindrical portion and adapted to support said arm, said bushing assembly comprising endwise abutting outer sleeve members, a tubular inner member concentric with said outer sleeve members, a pair of symmetrical resilient annular members disposed between said sleeve members and said tubular member, support means securing said tubular member against axial and rotary movement, an additional pair of sleeves press fitted in said cylindrical portion, and a thin film of Teflon on at least one of said pairs of sleeve members forming a low friction bearing surface coacting with the adjacent periphery of the other pair of sleeve members.

5. In combination, a swingable lever arm having a cylindrical portion integral therewith, a resilient bushing assembly disposed in said cylindrical portion and adapted to support said arm, said bushing assembly comprising endwise abutting flanged outer sleeve members, a tubular inner member concentric with said outer sleeve members, a pair of symmetrical resilient annular members disposed between said sleeve members and said tubular member and having flanged portions axially abutting the flanged portions of said sleeve members, support means securing said tubular member against axial and rotary movement and axially compressing said resilient annular members, an additional pair of flanged sleeves press fitted in said cylindrical portion, a thin film of sintered Teflon on at least one of said pairs of sleeve members forming a low friction bearing surface coacting with the adjacent periphery of the other pair of sleeve members, and circumferential axially directed ribs on the flanges of said resilient annular members engaging the flanges of said additional pair of sleeves to form a seal preventing entrance of foreign matter into said low friction bearing surface.

References Cited in the file of this patent
UNITED STATES PATENTS

| | | |
|---|---|---|
| 2,324,997 | Brown | July 20, 1943 |
| 2,704,234 | Love et al. | Mar. 15, 1955 |

FOREIGN PATENTS

| | | |
|---|---|---|
| 711,620 | Great Britain | July 7, 1954 |

OTHER REFERENCES

Automotive Industries, September 1, 1954, pages 107–108, 308-N—in Div. 45.